May 12, 1970      J. PIAT      3,511,104
POWER STEERING MECHANISM HAVING SENSITIVE CONTROLS
Filed April 9, 1968      4 Sheets-Sheet 2

Inventor:
Jean Piat
By
Karl W. Flocks
Attorney

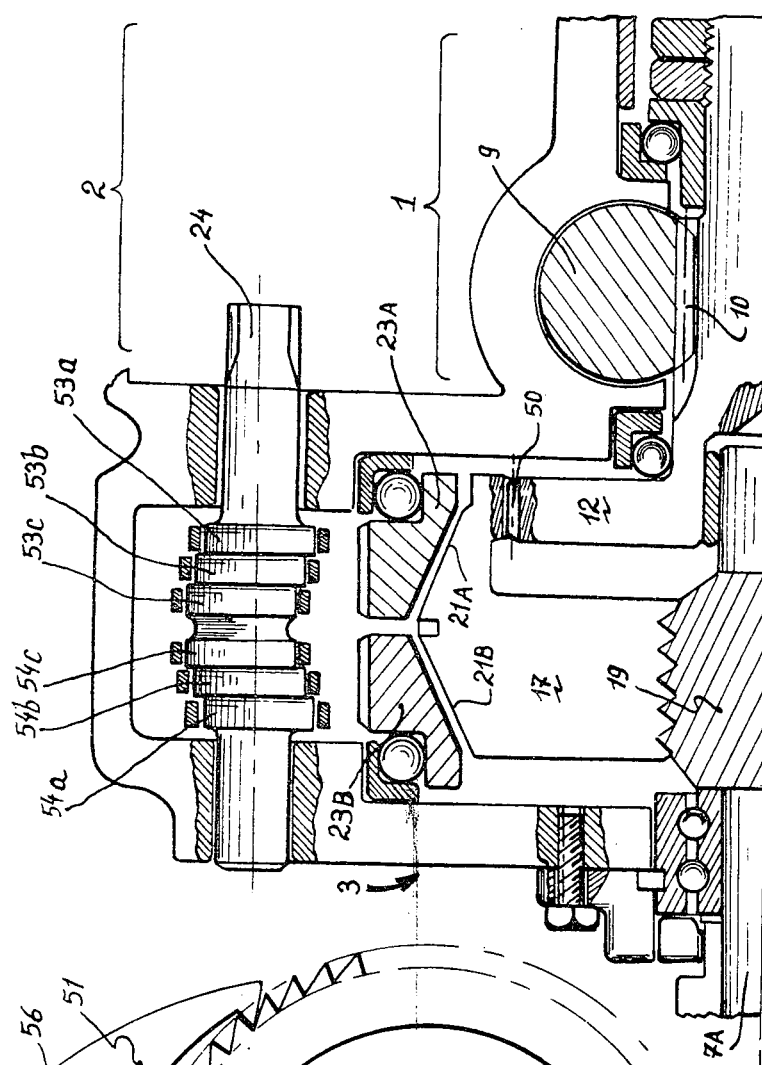
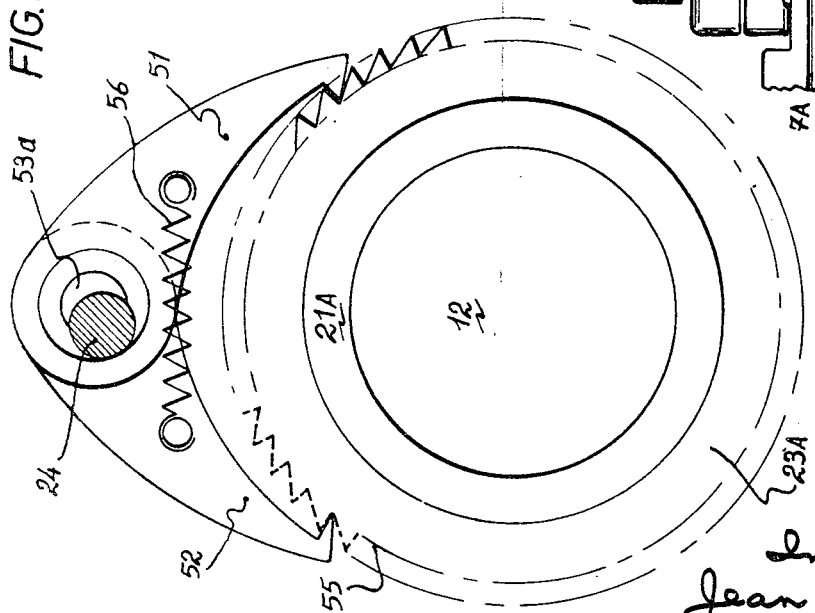

Inventor:
Jean Piat
By Karl W. Flocks
Attorney

United States Patent Office 3,511,104
Patented May 12, 1970

3,511,104
POWER STEERING MECHANISM HAVING
SENSITIVE CONTROLS
Jean Piat, La Varene, France, assignor of ninety percent
to Micapia, Paris, France, a joint-stock company of
France, and ten percent to Etablissements Piat,
Montreuil-sous-Bois, Seine-St.-Denis, France, a limited-
liability company of France
Filed Apr. 9, 1968, Ser. No. 719,941
Claims priority, application France, Apr. 13, 1967,
102,655; Aug. 18, 1967, 118,350
Int. Cl. B62d 5/02; F16h 35/00
U.S. Cl. 74—388                                   5 Claims

ABSTRACT OF THE DISCLOSURE

A sensitive control, more particularly adapted to the production of assisted steering systems for automobile vehicles or servo-control systems for machine-tools such as presses, in which any rotation of the steering-wheel of the vehicle or of the control handle of the machine-tool is assisted by the action of a motor driving at constant speed, but in opposite directions, two clutch-driving elements. A mechanism further converts the movement of rotation of the control-wheel to a movement of translation, in one direction or the other, depending on the direction of rotation of the wheel, of a sliding plate serving as a driven clutch element so as to bring it selectively into contact with one or the other of the driving elements of the clutch, said plate being coupled by a kinematic chain with a direct actauation member of the steering of the vehicle or the control of the machine-tool.

---

The present invention relates to an improved sensitive control, more particularly adapted for the production of servo-steering systems for automobile vehicles or servo-controls for machine tools such as presses for example.

The invention also relates, by way of new industrial products, to the servo-steering systems and the servo-controls utilizing the sensitive control in accordance with the invention.

The improved sensitive control forming the object of the present invention is essentially characterized by the fact that it comprises, in combination:

A driving member arranged to drive a driving shaft at least one constant speed of rotation;

A control hand-wheel at the disposal of the driver or the operator actuating in translation, in one direction or the other from a central neutral position, a member serving as the driven sliding clutch element;

A servo-system proper, constituted by two rotating members arranged on each side of the driven clutch element, these two members being coupled kinematically to the driving shaft so as to rotate at the same constant speed but in opposite directions to each other, and constituting the selective driving members for actuating the above-mentioned clutch; and means for kinematically coupling the driven element of the clutch to a direct actuation device of the steering of the vehicle or of the machine-tool.

In accordance with one advantageous form of embodiment, the servo-system is constituted by a first set of pinions directly coupling the driving shaft to a crown wheel rigidly coupled to one of the driving members of the clutch, and by a second set of pinions, mounted as satellites and indirectly coupling the said driving shaft to a second crown-wheel concentric with the first and rigidly coupled to the second driving member of the clutch, the driven member of the clutch being constituted by a threaded sleeve mounted on a screw with a quick thread fast for rotation with the control hand-wheel, the said sleeve comprising a plate, the edge of which has a double symmetrical slope capable of coming selectively into contact with one or the other of the driving members of the clutch and constituted by crown-wheels each provided with a sloping edge complementary to that corresponding on the plate of the driven member of the clutch.

According to an alternative form of embodiment of the invention, the two sets of pinions in engagement with the two crown-wheels are replaced by two sets of several pawls, for example three, mounted on eccentrics provided on the driving shaft and which respectively drive each crown-wheel in directions opposite to each other with a view to assisting, at the desired moment, the effort of the driver of the machine.

Other characteristics, advantages and particular features of the present invention will be brought out from the description which follows below with reference to the accompanying drawings, in which:

FIG. 4 is an axial longitudinal half-section of an alternative form of construction of a servo-steering system according to the invention, the driving member proper not being shown for the sake of clearness of the drawing;

FIG. 5 is a very simplified explanatory diagram of operation of the system of pawls ensuring the drive of the crown-wheels of the clutch;

Figure 1:
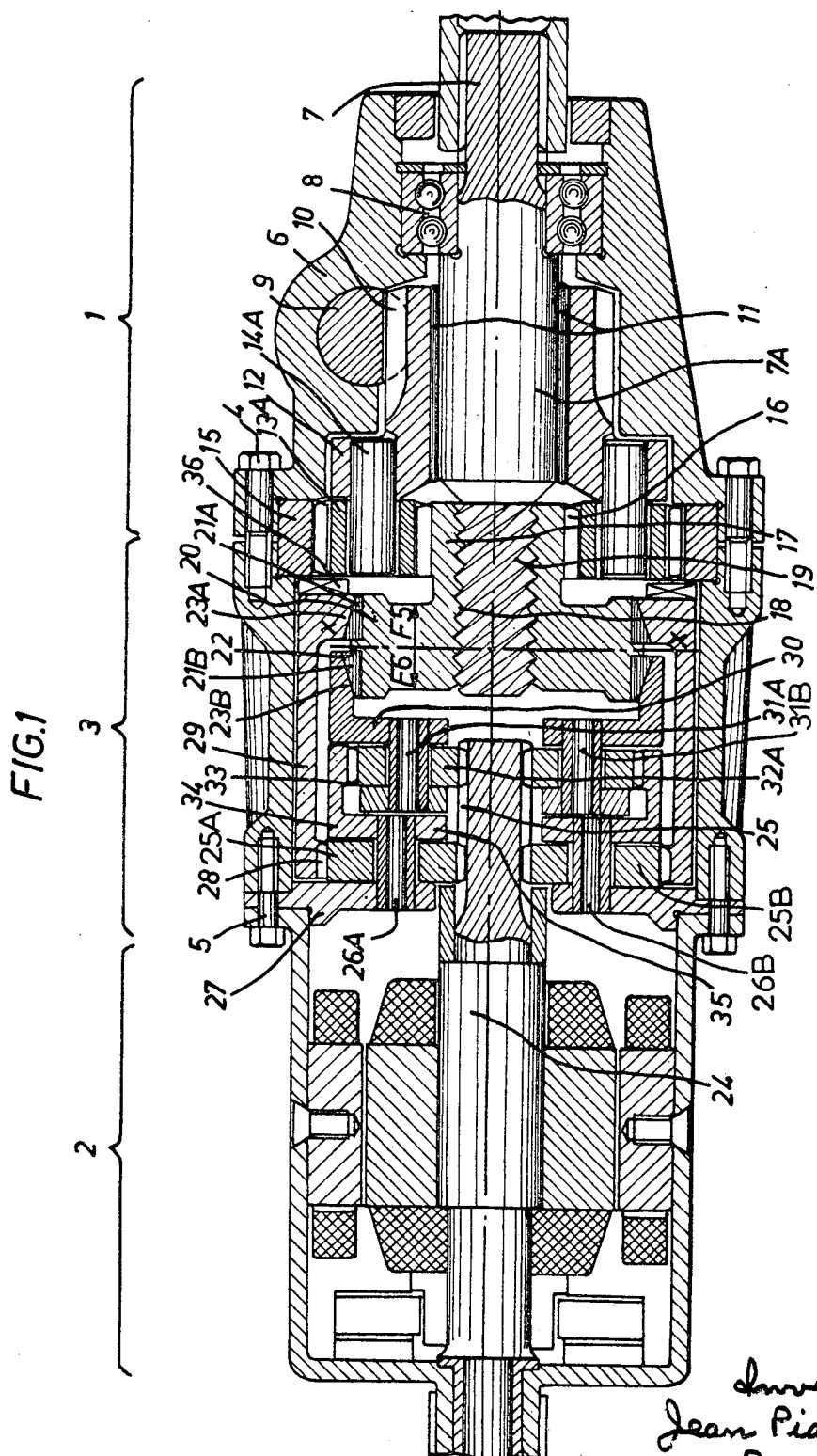
FIG. 1 is an axial longitudinal section of a very diagrammatic form of construction of a servo-steering system employing the principle of the invention.

The servo-steering system according to the invention and shown by way of example in FIG. 1 comprises three essential elements, namely:

The steering element proper indicated by the general reference 1, of a perfectly conventional type with a toothed rack;

The driving member indicated by the general reference 2, and the assisting or servo-element or the steering proper indicated by the general reference 3, which automatically applies in the desired direction the driving force of the driving element 2 on the steering element 1 in the manner which will be described in detail later.

The casings containing the above three constituent elements are fixed one on top of the other, for example by means of studs such as 4 and 5.

The steering element 1 is constituted by a casing 6 in which on the one hand the steering column pivots by means of a ball thrust-bearing 8; on the other hand the toothed-rack 9 slides perpendicular to the steering column.

This latter is in engagement with a pinion 10 which is freely rotatable on the head 7A of the column 7 by means of a needle-bearing 11, in order that the said pinion 10 may not be driven in rotation directly by the steering column, but by means of a pinion reduction gear in turn subjected to the action of the assistance element 3 as will be seen later.

The reduction gear unit (see also FIG. 2) is constituted by a satellite carrier 12 rigidly fixed to the pinion 10.

In order to obtain the centering of the steering column 7, these satellites are a minimum of two in number 13A, 13B, displaced by 180° with respect to each other.

Figure 2:
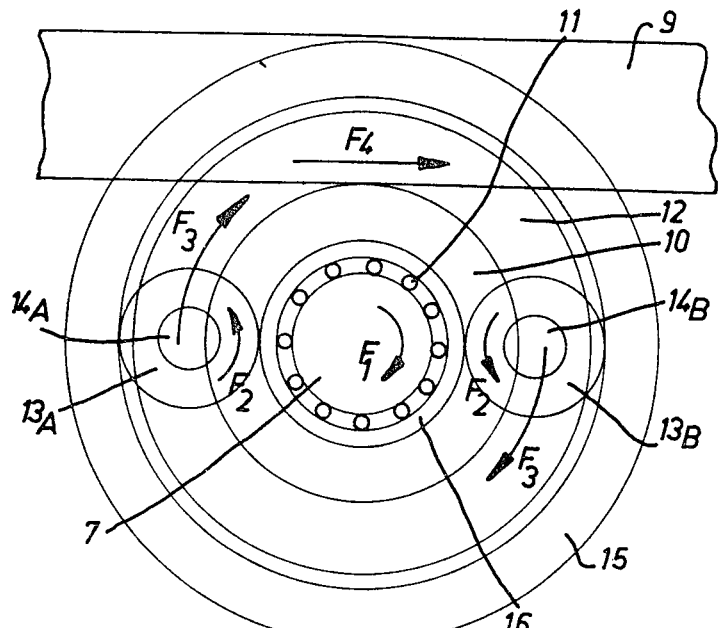
FIG. 2 is a very simplified explanatory diagrams of operations of the reduction gear system arranged between the steering column and the toothed rack.

It should be noted that, in order to faciiltate examination of FIG. 2, the satellites have been show in a position displaced by 90° with respect to that which they occupy in FIG. 1.

The satellites are mounted on shafts 14A, 14B, rigidly fixed to the satellite-carrier 12.

The satellites are in engagement on the one hand with a fixed outer ring gear 15 which is rigidly fixed on the two respective casings of the constituent elements 1 and 3; and on the other hand with a central pinion 16 rigidly fixed to a sleeve 17. This latter comprises an axial thread 18 which permits it to be mounted on a screw 19 with a very quick thread, which is mounted on the end of the head 7A of the steering column 7 and coaxially therewith.

The sleeve 17 comprises an annular shoulder or plate 20 which, as will be described in detail later, permits it to be driven in rotation in the same direction as the steering column is turned by the action of the assistance element 3.

It can immediately be seen from FIG. 2 that if the steering column 7 is turned, for example in the direction of the arrow F, the pinion 16 will drive the satellites 13A, 13B in the direction of the arrows F2 and, as the ring gear 15 is fixed, the satellite carrier 12 is rotated at reduced speed in the direction of the arrows F3. The pinion 10 in consequence rotatse in the same direction F3 and causes the toothed-rack 9 to slide in the direction of the arrow F4. The reverse result will obviously be obtained by turning the steering column in the direction opposite to the arrow F1.

According to an essential characteristic feature of the present invention, the edge portion of the plate 20 serves as the driven sliding element of a clutch.

To this end, it comprises two identical rings 21A, 21B of frusto-conical section arranged symmetrically on each side of the plane of symmetry XX so that the sloping faces of these rings is directed towards the exterior. These rings are made of a material similar to that employed for the construction of the synchronizer rings of gear boxes. A central shoulder 22 separates the two rings so as to prevent any inter-action between them.

It will further be clear from FIG. 1 that if the steering column 7 is rotated in the clockwise direction, the sleeve 17 and its plate 20 will be moved in the direction of the arrow F5 by the action of the screw 19.

On the other hand, if the steering column 7 rotates in the anti-clockwise direction, the sleeve 17 moves in the direction of the arrow F6.

In the first case, the ring 21A comes into contact with the inclined edge of a crown-wheel 23A, the section of which is complementary to that of the ring, while in the second case it is the ring 21B which comes into contact with the inclined edge of a crown-wheel 23B having a complementary section.

It is quite clear that the distances between these various elements are determined in such manner that, on the one hand, when the plate 20 is in its central neutral position, neither of the rings 21A and 21B is in contact with the corresponding crown-wheels 23A, 23B, and that on the other hand when one of the rings is in contact with the corresponding crown-wheel, the other ring and the other crown-wheel have absolutely no contact.

According to another essential characteristic feature of the invention, the crown-wheels 23A and 23B are driven in rotation at constant speed but in opposite directions to each other, the first (see also FIGS. 2 and 3) in the direction F7 which must be the same as F4, and the second in the opposite direction F8.

The driving force is advantageously provided by a direct-current electric motor 2 of any standard type, the shaft 24 of which rotates in the direction F9 and is provided at its extremity with a pinion 25. With this pinion 25 are engaged at least two reduction pinions 25A, 25B displaced by 180° with respect to each other so as to obtain good centering, these pinions being carried by shafts 26A, 26B fixed in the frame 27. The pinions 25A, 25B also engage with teeth 28 provided on an extension 29 of the crown-wheel 23A which forms a bridge between the plate 20 and the pinions 25A, 25B.

The other crown-wheel 23B is rigidly fixed to a satellite-carrier plate 30. The shafts 31A, 31B of the satellites 32A, 32B are keyed on the said plate at 180° from each other, against for the purpose of obtaining good centering.

The satellites 32A, 32B engage on the one hand with the pinion 25 of the driving shaft 24 and on the other hand with the teeth 33 of a crown-wheel 34 fast with a fixed annular plate 35 in which are fixed the shafts 26A, 26B of the reduction gear pinions 25A, 25B.

Figure 3:
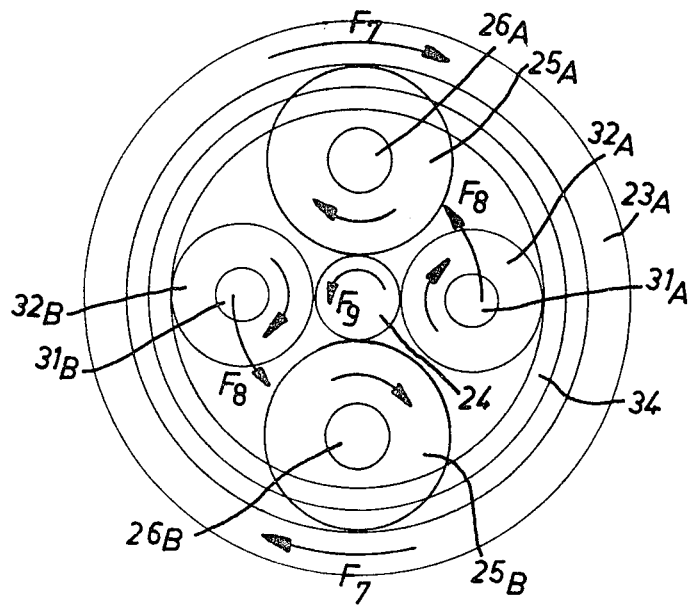
FIG. 3 is a very simplified explanatory diagram of the operation of the satellite system of the servo-system proper.

Referring to FIG. 3, it is seen that the desired result is actually obtained, namely that the crown-wheels 23A, 23B actually rotate at constant speed and in opposite directions, it being understood that the diameters of the various crown-wheels and pinions in engagement are determined in such manner that the two crown-wheels rotate at the same speed, or at least at speeds very close to each other.

It can be seen that if the steering wheel is rotated, for example towards the right, the quick-threaded screw 19 drives the plate 20 in the direction F5, which has the effect of immediately applying the ring 21A against the crown-wheel 23A which rotates continuously in the direction F7 and is retained longitudinally, for example by means of a ball thrust-bearing 36. There is then engagement between the plate 20 and the crown-wheel 23A, which causes an immediate assistance, and finally, as has been previously seen, the sliding of the toothed-rack 9 in the direction F4 without any effect being required from the driver.

If on the other hand the steering-wheel is held stationary in the turned position, there is slip of the crown-wheel 23A on the ring 21A and the steering is automatically held in this position without any effort from the driver.

As soon as the steering-wheel is brought back to the neutral position, the assistance is suppressed and begins again as soon as the steering-wheel passes from the neutral position in either direction.

Without departing from the scope of the invention, it will readily be possible to provide a control device of any known type put at the disposal of the driver and permitting at least two speeds of rotation to be obtained for the motor 2, a high speed of rotation which will be employed to ensure powerful assistance for the operations of the vehicle during parking and a lower speed of rotation which will be employed to provide a smaller amount of assistance for the normal use of the vehicle on the road.

According to the alternative form of embodiment of the invention shown by way of example in FIGS. 4 and 5, the two sets of pinions 25A, 25B on the one hand and 32A, 32B on the other, coupling, directly for one of the sets and indirectly for the other set, the driving shaft 24 to the two crown-rings 23A and 23B of the clutch are replaced by a system of driving pawls which will now be described in detail.

Referring now to FIG. 4, it is seen that on the head 7A on the steering column is mounted a screw 19 with a very quick thread, for example 45°, so as to provide a good sensitivity for the sensitive control according to the invention. This screw drives a sleeve 17 which is in turn directly engaged with the pinion 10 driving the toothed-rack 9 by means of a carrier 12 of large diameter, on which is provided a circular engagement by radial teeth 50 with free axial play without friction.

According to the first form of construction, the assistance to the conventional steering element 1 is applied by means of a driving member 2 through the action of the crown-wheels 23A and 23B which respectively come into contact with the ring 21A of frusto-conical section or the ring 21B, depending on whether the steering column 7 requires an action to the right or to the left.

According to the alternative form of construction given in FIGS. 4 and 5, the crown-wheel 23A is driven tooth by tooth by pawls 51 and the crown-wheel 23B is driven in the opposite direction by pawls 52. The pawls are urged towards each other and towards the teeth of the crown-wheels by a spring 56.

In order to obtain a practically continuous movement of the crown-wheel 23A without jerks, in spite of the intermittent action of the hook of the pawl on the teeth, there are in fact provided three pawls 51 mounted on three eccentrics 53a, 53b and 53c, radially spaced apart by 120° from each other about the driving shaft 24.

Similarly, there are provided for driving the crown-wheel 23B, three pawls 52 mounted respectively on three eccentrics 54a, 54b and 54c.

If there are provided for example 100 teeth 55 on a crown-wheel 23A or 120 mm. in diameter, the eccentric 53a, will have a diameter of about 7 mm., for a diameter of 3.5 mm. for the shaft 24.

If the driving member 2 drives the shaft 24 at 3,000 r.p.m. each revolution will cause three working travels of the pawls, which results in a speed of 90 r.p.m. of the carrier 12 in engagement on the toothed-rack 9, or 1.5 revolutions per second, which is the maximum desirable for maneuvering in the vicinity of a parking place, for example.

On the other hand, if the speed of the driving element 2 is inversely regulated on that of the driving engine of the vehicle, at high road speeds there can be provided for the shaft 24 a speed of 200 r.p.m. for example, which gives only one revolution every ten seconds for the assistance to the carrier 12, which is quite pleasant for the driver.

It results from the foregoing description that the form of embodiment shown in FIGS. 4 and 5 has considerable advantages, amongst which there may be cited the following:

The drive by pawl, making it possible to gear-down the driving torque at the rate of a forward movement of one tooth of the crown-wheel driven by each pawl for one revolution of the driving shaft, has the first effect of permitting te servo-control to be driven by a motor of very low power, for example a power of 50 watts;

In addition, the number of parts of the equipment is considerably reduced with respect to a reduction gear by satellite carrier and to a reversal of direction by satellites;

The high step-down gear permitted by the tooth-by-tooth drive also permits a speed of the driving motor for example inversely proportional to the actual speed of the machine, which enable for example in the case of an automobile vehicle, advantage to be taken of an assistance at high speed on a vehicle during slow maneuvers and on the contrary on a slow assistance at a low speed on a vehicle travelling at high speed on the road.

Figure 6:
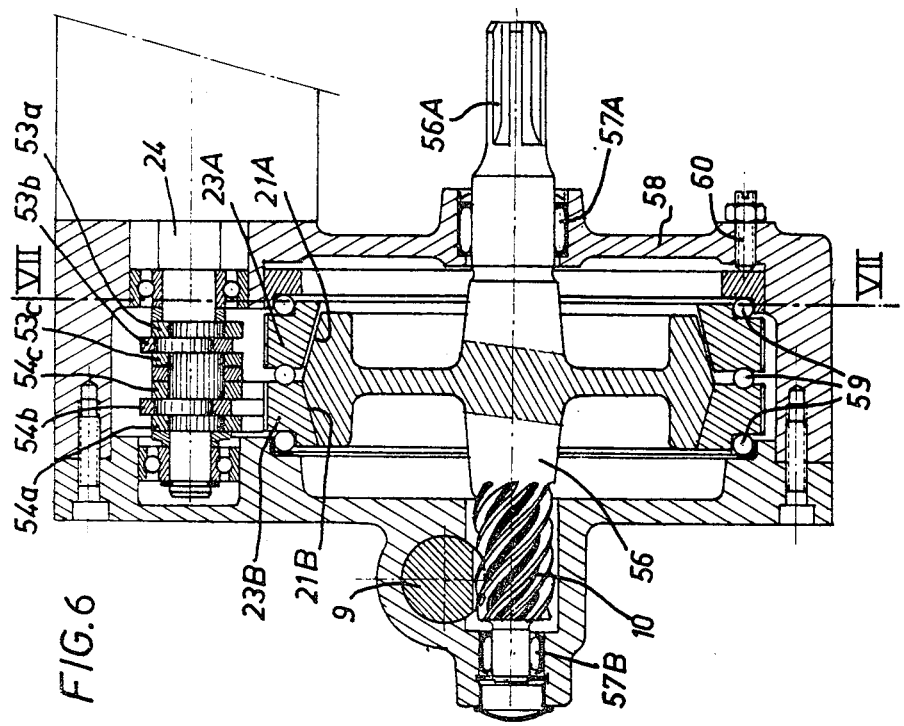
FIG. 6 is an axial longitudinal section of another alternative form of construction of a servo-steering system according to the invention, the driving member proper not being shown for the sake of clearness of the drawing.
Figure 7:
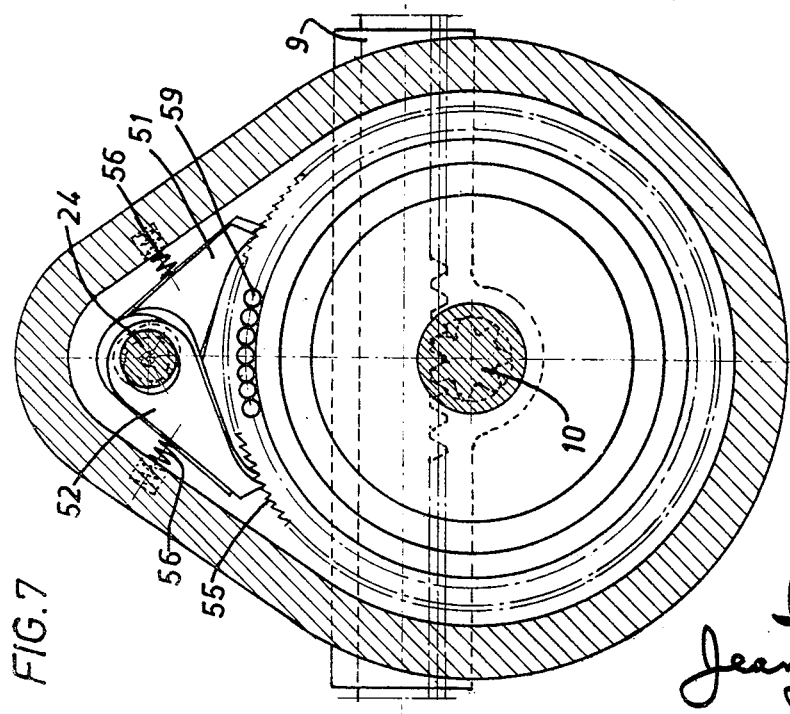
FIG. 7 is a transverse section taken along the line VII—VII of FIG. 6.

Finally, as the drive by pawl is an escapement drive, it can never lock the direct control in the case of failure of the servo-control system, and thus provides a high degree of safety.:

According to the alternative form of construction shown in FIGS. 6 and 7, the system of control of longitudinal displacement of the driven member 17 of the clutch is simplified appreciably with respect to the screw and sleeve system of the foregoing forms of embodiment.

To this end, the plate with a double symmetrical slope 21A, 21B is rigidly fixed on a shaft 56 mounted in two bearings 57A, 57B of the casing 58, the said shaft being thus able to slide longitudinally so as to come into engagement with one or the other of the two crown-wheels 23A, 23B. One of the extremities 56A of the shaft 56 is provided with a telescopic coupling with the steering column, while on its other extremity is keyed the helicoidal pinion 10 with a quick thread, in engagement with the toothed-rack 9 actuating the steering system.

The crown-wheels 23A and 23B are maintained longitudinally by ball thrust-bearings 59, a ring and screw arrangement 60 enabling ultimate wear of the clutch to be taken-up.

The said crown-wheels 23A and 23B are driven in rotation by pawl systems 51, 52 as in the form of construction of FIGS. 4 and 5 and no description of these will be given so as to avoid unnecessary complication of the present text.

It is seen that when the steering-wheel is actuated in one direction or in the other, the helicoidal pinion 10 will apply a longitudinal thrust to the shaft 56 in one direction or the other, and that the plate 21A, 21B will come into contact with one or the other of the two crown-wheels 23A, 23B.

It will be realized that in this way a servo-control is obtained which is particularly simple, and in which the number of parts is reduced to the absolute minimum.

It is quite obvious that instead of a toothed-rack system there may be employed equally well a system with a pinion and toothed segment, the only necessity being that of having a pinion with a quick thread and an assembly with ball thrust-bearings for the toothed segment.

Furthermore, it is also quite clear that the invention, more particularly adapted to provide assistance for the steering of an automobile vehicle, can be applied equally well to the sensitive control of machine-tools, especially presses, by making a few detail modifications.

In this case, the steering column is replaced by a crank-handle, the toothed-rack acting, not on the steering-wheels, but on the control system of the machine tool.

I claim:

1. A sensitive control, more particularly adapted to the production of assisted steering systems for automobile vehicles or servo-controls for machine-tools, in which any rotation of the steering-wheel of the vehicle or of the control handle of the machine-tool in one direction or the other is assisted by a driving member, the said sensitive control comprising, in combination:

a driving member driving a driving shaft at at least one constant speed of rotation;

a mechanical device converting the movement of rotation of the steering column coupled to the steering-wheel to a movement of translation of a member acting as the driven sliding element of a clutch;

the said driven sliding element moving in either direction from a central neutral position, depending on the direction of rotation of the said steering column;

an assistance system constituted by two rotating members arranged on each side of the said driven clutch element and constituting the selective driving members of the said driven element;

two kinematic chains respectively coupling each of the said rotating members to the said driving shaft coupled to the driving member;

said two kinematic chains being arranged so that said two rotating members rotate at the same constant speed but in opposite directions;

and a kinematic chain coupling said driven clutch element to a direct actuating member of the steering of the vehicle;

said assistance system constituted by two sets of several pawls mounted on eccentrics provided on the driving shaft and which respectively drive crown-wheels at the same constant speed in opposite directions to each other, said crown-wheels being provided for that purpose with external teeth in engagement with said pawls, and one of said crown-wheels rigidly fixed to one of the driving members of said clutch and the other of said crown-wheels rigidly fixed to a second driving member of the clutch.

2. A sensitive control as claimed in claim 1, in which the system of pawls comprises, for each crown-wheel, a set of three pawls mounted on three eccentrics, the axes of which are respectively displaced by 120° with respect to each other.

3. A sensitive control, more particularly adapted to the production of assisted steering systems for automobile vehicles or servo-controls for machine-tools, in which any rotation of the steering-wheel of the vehicle or of the control handle of the machine-tool in one direction or the other is assisted by a driving member, the said sensitive control comprising, in combination:
   a driving member driving a driving shaft at at least one constant speed of rotation;
   a mechanical device converting the movement of rotation of the steering column coupled to the steering-wheel to a movement of translation of a member acting as the driven sliding element of a clutch;
   the said driven sliding element moving in either direction from a central neutral position, depending on the direction of rotation of the said steering column;
   an assistance system constituted by two rotating members arranged on each side of the said driven clutch element and constituting the selective driving members of the said driven element;
   two kinematic chains respectively coupling each of the said rotating members to the said driving shaft coupled to the driving member;
   said two kinematic chains being arranged so that said two rotating members rotate at the same constant speed but in opposite directions;
   and a kinematic chain coupling said driven clutch element to a direct actuating member of the steering of the vehicle;
   said mechanical device for converting the movement of rotation to a movement of translation constituted by a shaft telescopically coupled for rotation to the steering column and adapted to slide longitudinally under the action of the thrust applied by a helicoidal pinion keyed on its free extremity and in engagement with a toothed-rack acting directly on the steering of the vehicle, said sliding shaft comprising a plate having an edge with a double symmetrical slope adapted to come selectively into contact with one or the other of the driving members of the clutch constituted by crown-wheels each provided with a sloping edge complementary to that corresponding thereto on the plate of the driven member of said clutch.

4. A sensitive control, more particularly adapted to the production of assisted steering systems for automobile vehicles or servo-controls for machine-tools, in which any rotation of the steering-wheel of the vehicle or of the control handle of the machine-tool in one direction or the other is assisted by a driving member, the said sensitive control comprising, in combination:
   a driving member driving a driving shaft at at least one constant speed of rotation;
   a mechanical device converting the movement of rotation of the steering column coupled to the steering-wheel to a movement of translation of a member acting as the driven sliding element of a clutch;
   the said driven sliding element moving in either direction from a central neutral position, depending on the direction of rotation of the said steering column;
   an assistance system constituted by two rotating members arranged on each side of the said driven clutch element and constituting the selective driving members of the said driven element;
   two kinematic chains respectively coupling each of the said rotating members to the said driving shaft coupled to the driving member;
   said two kinematic chains being arranged so that said two rotating members rotate at the same constant speed but in opposite directions;
   and a kinematic chain coupling said driven clutch element to a direct actuating member of the steering of the vehicle;
   said assistance system constituted by pawls mounted on eccentrics provided on the driving shaft and which respectively drive the crown-wheels at the same constant speed in opposite directions to each other, said crown-wheels being provided for that purpose with external teeth in engagement with said pawls, and one of said crown-wheels rigidly fixed to one of the driving members of said clutch and the other of said crown-wheels rigidly fixed to a second driving member of the clutch;
   said mechanical device for converting the rotational movement of a translation movement constituted by a threaded sleeve mounted on a screw with a quick thread coupled for rotation to the steering column, said sleeve comprising a plate having an edge with a double symmetrical slope capable of selectively coming into contact with one or the other of the driving members of the clutch constituted by said crown-wheels each provided with a sloping edge complementary to that corresponding to it on the plate of the driven member of said clutch.

5. A sensitive control as claimed in claim 4, in which the system of pawls comprises, for each crown-wheel, three pawls mounted on three eccentrics, the axes of which are respectively displaced by 120° with respect to each other.

References Cited

UNITED STATES PATENTS

| | | |
|---|---|---|
| 2,972,902 | 2/1961 | Rockwell. |
| 3,062,069 | 11/1962 | Hansen. |
| 2,534,536 | 12/1950 | Staude. |
| 3,191,109 | 6/1965 | Hepner _____ 180—79.1 X |
| 3,424,020 | 1/1969 | Hanna. |

FOREIGN PATENTS 572,934   10/1945   Great Britain.

LEONARD H. GERIN, Primary Examiner

U.S. Cl. X.R.

74—84; 180—79.1